US010860113B2

United States Patent
Chen et al.

(10) Patent No.: US 10,860,113 B2
(45) Date of Patent: Dec. 8, 2020

(54) AUGMENTED REALITY HEAD GESTURE RECOGNITION SYSTEMS

(71) Applicant: Atheer, Inc., Santa Clara, CA (US)

(72) Inventors: Yu-Hsiang Chen, Santa Clara, CA (US); Soulaiman Itani, Santa Clara, CA (US)

(73) Assignee: Atheer, Inc., Santa Clara, CA (US)

( * ) Notice: Subject to any disclaimer, the term of this patent is extended or adjusted under 35 U.S.C. 154(b) by 0 days.

(21) Appl. No.: 16/421,823

(22) Filed: May 24, 2019

(65) Prior Publication Data
US 2019/0369716 A1 Dec. 5, 2019

Related U.S. Application Data

(60) Provisional application No. 62/678,211, filed on May 30, 2018.

(51) Int. Cl.
*G06F 3/01* (2006.01)
*G06T 7/60* (2017.01)
(Continued)

(52) U.S. Cl.
CPC .......... *G06F 3/017* (2013.01); *G02B 27/017* (2013.01); *G06F 3/011* (2013.01); *G06F 3/012* (2013.01); *G06F 3/0482* (2013.01); *G06F 3/0485* (2013.01); *G06F 3/04845* (2013.01); *G06K 9/00355* (2013.01); *G06K 9/00375* (2013.01); *G06Q 10/0633* (2013.01); *G06Q 10/06316* (2013.01); *G06Q 10/063116* (2013.01); *G06T 7/60* (2013.01); *G06T 7/73* (2017.01);
(Continued)

(58) Field of Classification Search
CPC .......... G02B 27/017; G02B 2027/0138; G02B 2027/014; G06F 3/011; G06F 3/012; G06F 3/017; G06F 3/04815; G06F 3/0482; G06F 3/04845; G06F 3/0485; G06F 2203/04806; G06K 9/00355; G06K 9/00375; G06K 2009/00395; G06Q 10/063116; G06Q 10/06316; G06Q 10/0633; G06T 7/60; G06T 7/73; G06T 2207/30196
See application file for complete search history.

(56) References Cited

U.S. PATENT DOCUMENTS

| | | | |
|---|---|---|---|
| 9,007,301 B1* | 4/2015 | Raffle | G09G 3/003 345/156 |
| 2016/0005263 A1* | 1/2016 | Keilwert | G07F 17/3206 463/33 |
| 2018/0113599 A1* | 4/2018 | Yin | G06F 3/0236 |

* cited by examiner

*Primary Examiner* — Nelson M Rosario
(74) *Attorney, Agent, or Firm* — Miller IP Law, LLC

(57) ABSTRACT

A method, system, apparatus, and/or device for moving or scrolling a virtual object in a virtual or augmented reality environment. The method, system, apparatus, and/or device may include: detecting, by a first sensor, a first gesture associated with selecting a first virtual object in an augmented reality environment displayed by a head-mounted display; displaying, by the head-mounted display, a first indicator indicating a selection of the first virtual object by a user; detecting, using the first sensor or a second sensor, a first movement of the head-mounted display associated with a first movement command; and in response to detecting the first movement of the head-mounted display, executing the first movement command, where the first movement command is a scrolling function to scroll text or a graphical object of the first virtual object or a movement function to move the text or the graphical object of the first virtual object.

20 Claims, 7 Drawing Sheets

(51) Int. Cl.
  *G06T 7/73*    (2017.01)
  *G06K 9/00*    (2006.01)
  *G06F 3/0484*   (2013.01)
  *G02B 27/01*    (2006.01)
  *G06Q 10/06*    (2012.01)
  *G06F 3/0482*   (2013.01)
  *G06F 3/0485*   (2013.01)

(52) U.S. Cl.
  CPC .................. *G02B 2027/014* (2013.01); *G02B 2027/0138* (2013.01); *G06F 2203/04806* (2013.01); *G06K 2009/00395* (2013.01); *G06T 2207/30196* (2013.01)

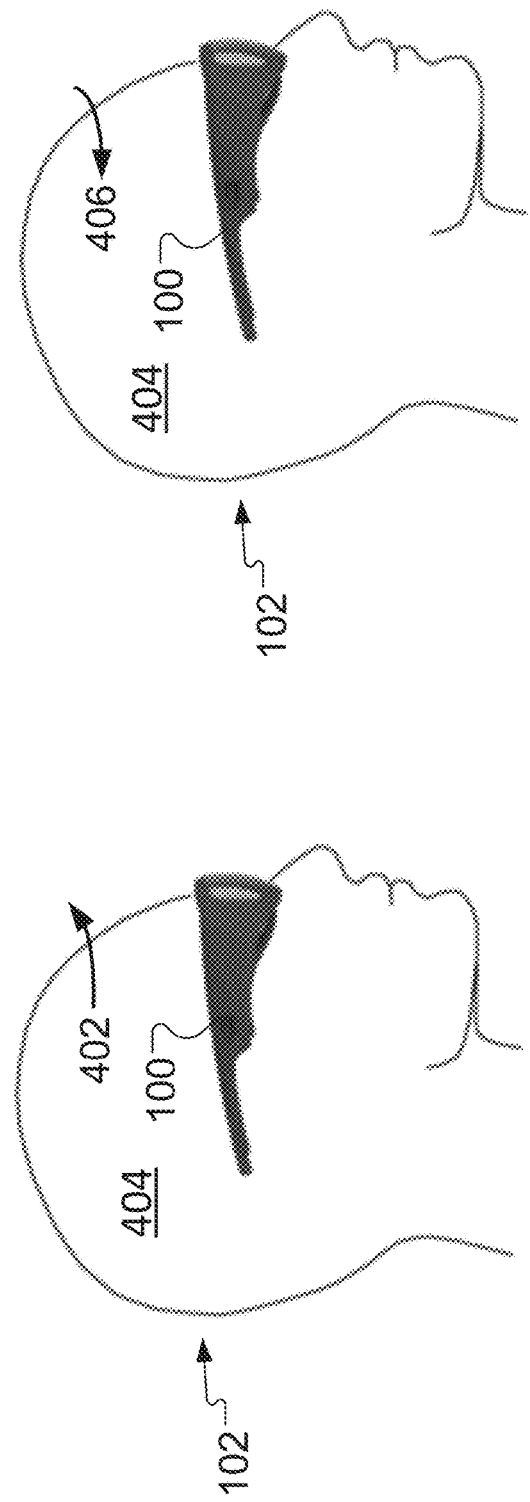
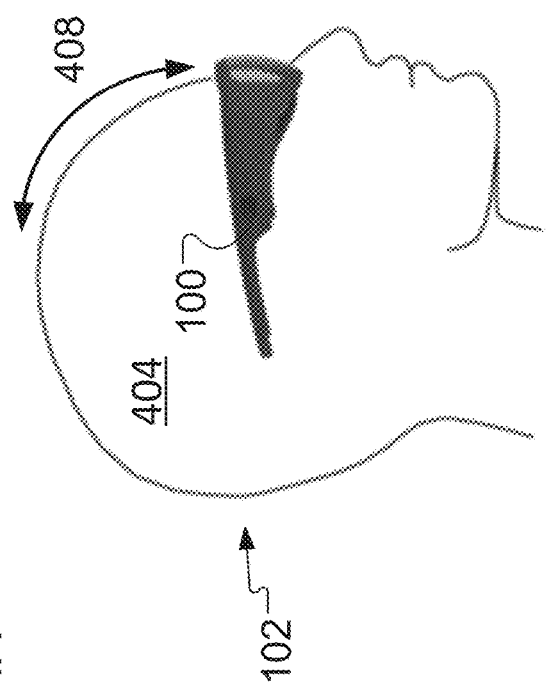

AUGMENTED REALITY HEAD GESTURE RECOGNITION SYSTEMS

CROSS-REFERENCE TO RELATED APPLICATION

This application claims the benefit of U.S. Provisional Application No. 62/678,211, filed on May 30, 2018, which are hereby incorporated by reference for all purposes.

BACKGROUND

An increasing number of workers in a variety of industries are assisted by hand-held or wearable computer systems. Rather than using computer kiosks or workstations at locations throughout the work environment, the hand-held or wearable computers allow the worker to move freely about the workspace and retrieve information from computer networks accessible at their fingertips, while they maintain in proximity to the object used for the task.

BRIEF DESCRIPTION OF THE DRAWINGS

The present description will be understood more fully from the detailed description given below and from the accompanying drawings of various embodiments of the present embodiment, which is not to be taken to limit the present embodiment to the specific embodiments but are for explanation and understanding.

FIG. 4A illustrates a gesture detected by a sensor of the wearable device, according to an embodiment.

FIG. 4B illustrates another gesture detected by a sensor of the wearable device, according to an embodiment.

FIG. 4C illustrates another gesture detected by a sensor of the wearable device, according to an embodiment.

DETAILED DESCRIPTION

Figure 1A:
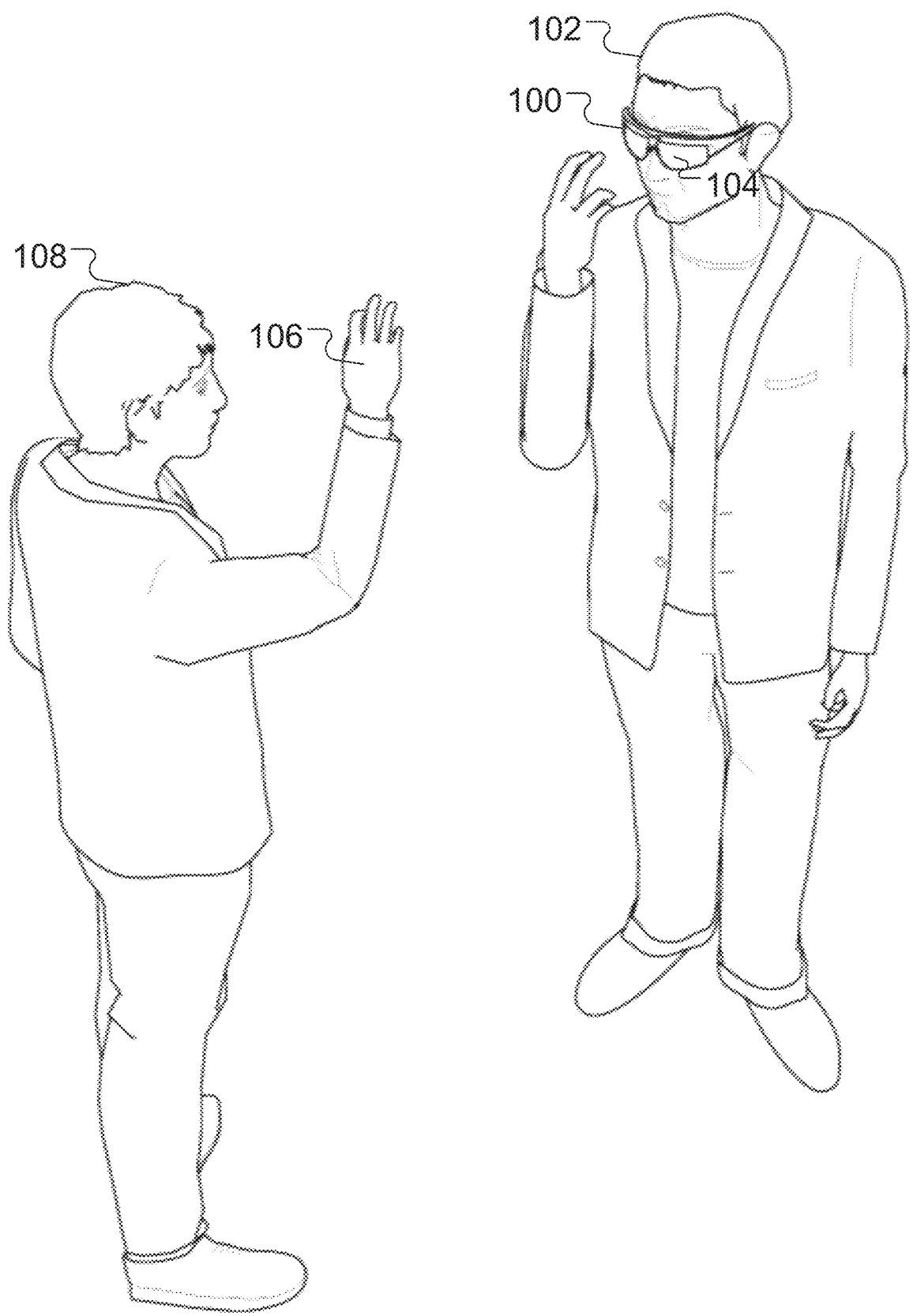
FIG. 1A illustrates a wearable device being worn by a user, according to an embodiment.

The disclosed augmented reality head gesture recognition systems will become better understood through a review of the following detailed description in conjunction with the figures. The detailed description and figures provide merely examples of the various embodiments described herein. Those skilled in the art will understand that the disclosed examples may be varied, modified, and altered and not depart from the scope of the embodiments described herein. Many variations are contemplated for different applications and design considerations; however, for the sake of brevity, the contemplated variations may not be individually described in the following detailed description.

Throughout the following detailed description, examples of various augmented reality head gesture recognition systems are provided. Related features in the examples may be identical, similar, or dissimilar in different examples. For the sake of brevity, related features will not be redundantly explained in multiple examples. Instead, the use of related feature names will cue the reader that the feature with a related feature name may be similar to the related feature in an example explained previously. Features specific to a given example will be described in that particular example. The reader is to understand that a given feature need not be the same or similar to the specific portrayal of a related feature in any given figure or example.

Individuals that work in industries where their hands must remain free to perform tasks may use wearable computer systems to retrieve and/or view information needed to perform the tasks. For example, individuals working in manufacturing facilities may be required to maintain a clean and hygienic manufacturing area to prevent cross-contamination. Additionally, in the manufacturing environment and other environments, it may be required to record that all the steps and instructions in a defined manufacture procedure were performed. Wearable computer systems may aid in recording all the steps and instructions that were performed and investigating or documenting deviations taken during the manufacturing procedure. The records of the manufacturing and distribution of items with a complete manufacturing history may enable a manufacturer to retain the manufacturing information in a comprehensible and accessible format in case an investigation is needed to determine a product defect or failure. In another example, in retail operation environments, sales assistants or inventory control clerks may use wearable computer systems to identify products and/or retrieve product information associated with the product.

It may be difficult for individuals to interact with conventional wearable computer systems. For example, in the clean and hygienic manufacturing conditions, an individual may not be able to use their hands to interact with the wearable computer systems in order to maintain the clean and hygienic environment. Similarly, in a medical environment, medical personnel may not be able to use their hands to interact with the wearable computer systems in order to avoid introducing contagions into an operating environment. The conventional wearable computer systems may use touch-screens or mobile devices for the users to interact with the system.

Additionally, the conventional systems may use integrated displays or remote displays to display information to the individuals. However, the conventional integrated displays or remote displays may not be viewable to the user. For example, medical personnel may not be able to view the conventional integrated displays or remote displays as they perform medical procedures. Similarly, an individual in a clean and hygienic environment performing a manufacturing process may not be able to view the conventional integrated displays or remote displays as they perform manufacturing procedures.

Implementations of the disclosure address the above-mentioned deficiencies and other deficiencies by providing methods, systems, devices, or apparatus to display an augmented reality environment to users and provide interactive user interfaces. In one embodiment, the augmented reality systems may be head-mounted systems. The augmented reality systems may include sensors and/or detector units to detect, gather, and/or transmit data to a processing device. The processing device may be an integrated or onboard processing device or an external or remote processing device. The augmented reality systems may include an augmented reality display to overlay or display information to a user.

In one embodiment, the augmented reality systems may provide a user access to remote help, capture images, take sensor measurements, send data to send to a remote individual, and so forth. For example, an augmented reality system may transmit a still image or a video from a perspective of the user, also referred to as a "see what I see" perspective. In another example, the augmented reality systems may overlay images or information into an augmented reality environment display for a viewer to see a projected perspective of the images or information. An advantage of the augmented reality system may be to provide a user interface for a user to interact with in a variety of environments, include hands-free environments, clean and hygienic environments, collaborative environments, remote environments, and so forth.

FIG. 1A illustrates a perspective view of a wearable device 100 being worn by a user 102, according to an embodiment. The wearable device 100 is designed to display an image near an eye or eyes of a user 102 and execute computer-executable instructions in response user gestures by incorporating motion and image capture features. The wearable device 100 may include lens 104 substantially near the eye(s) of the user 102. The lens 104 may include a transparent or partially transparent screen that is at least partially disposed within a field of view of the user 102. The screen may display an augmented reality where a user may be able to view augmented reality objects. The screen may have a transparency level to enable the user 102 to see gestures 106 and real-world objects 108.

Figure 1B:
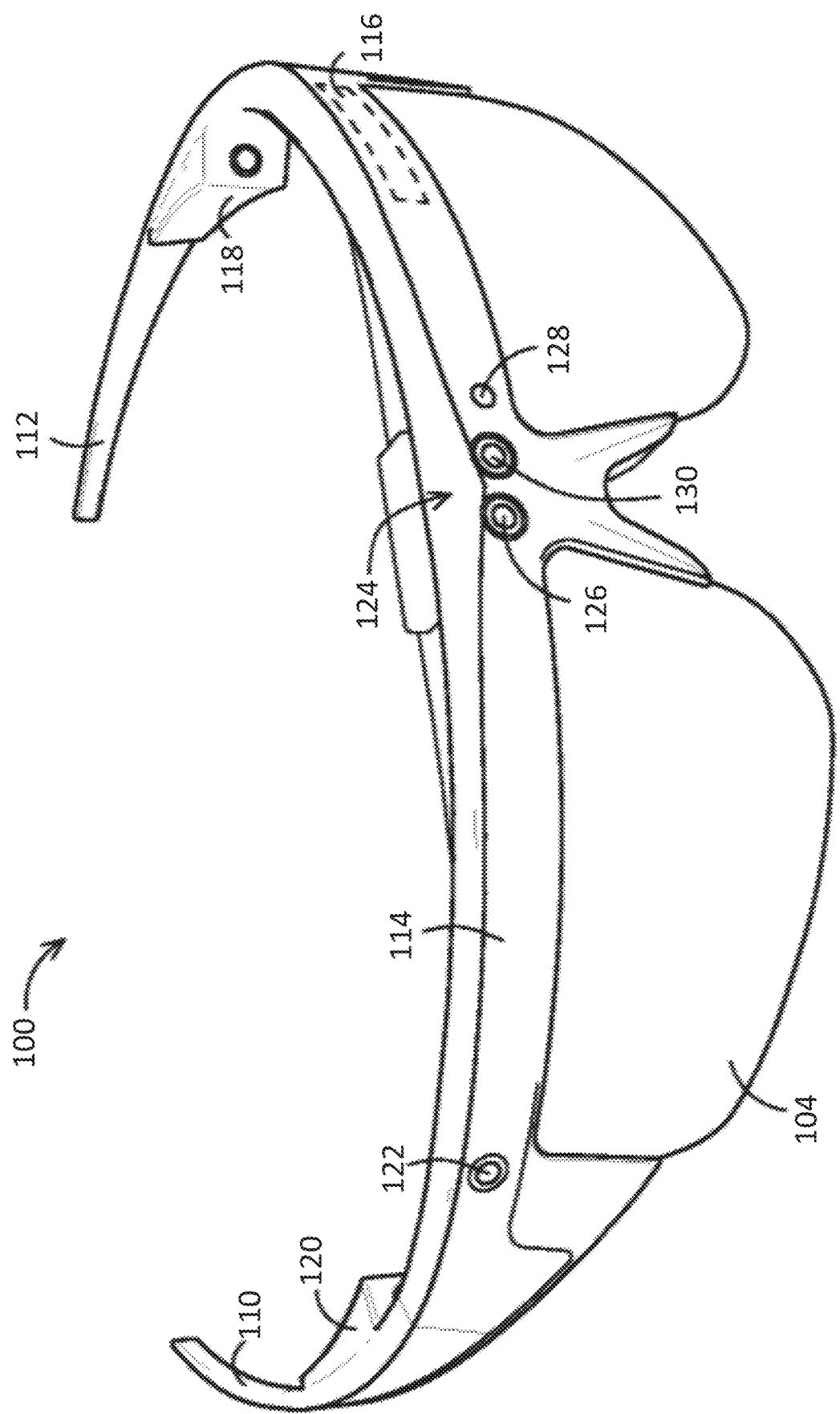
FIG. 1B illustrates a perspective view of the wearable device in FIG. 1A, according to an embodiment.

FIG. 1B illustrates a perspective view of the wearable device 100 in FIG. 1A, according to an embodiment. Some of the features in FIG. 1B are the same or similar to some of the features in FIG. 1A as noted by same reference numbers, unless expressly described otherwise.

The wearable device 100 may include a first temple 110, a second temple 112, and a bar 114 extending between the two temples 110 and 112. The first temple 110 and second temple 112 extend from the wearable device 100 to rest on the ears of the user 102 in FIG. 1A to provide support for the wearable device 100.

The wearable device 100 may include a processing device 116, the lens 104, a first image generator 118, a second image generator 120, a motion capture device 124, and a microphone 122. The wearable device 100 may be configured to capture user gestures, along with other objects within a captured scene, and execute computer processes or commands in response to the captured objects. This may involve manipulating a display produced by a first image generator 118 and/or a second image generator 120 on lens 104. For example, the first image generator 118 may display a first virtual object or portion of a virtual object on a first portion of the lens 104. In another example, the second image generator 120 may display a second virtual object or portion of a virtual object on a second portion of the lens 104. In another example, the lens 104 may be a single continuous lens extending across the bar 114. In another example, the lens 104 may include multiple lens or portions of lens extending across the bar 114.

The wearable device 100 may additionally execute computer processes in response to audio captured by the microphone 122. By incorporating these capturing technologies, the wearable device 100 may display and control computer images and processes. The processing device 116 may be supported by the bar 114. The processing device 116 may be configured to execute computer-executable instructions and control the electronic elements of the wearable device 100.

The processing device 116 may acquire data from other elements of the wearable device 100 or from external sources and execute computer executable code in response to this data. For example, the processing device 116 may be configured to acquire data from the motion capture device 124 such as data that corresponds to a user gesture. The processing device 116 may additionally or alternatively acquire data from the microphone 122. In some examples, the processing device 116 may acquire data from a separate device, such as a portable music player, a personal data assistant (PDA), a smartphone, a global positioning system (GPS), or the like.

The processing device 116 may be in coupled to the first image generator 118 and/or the second image generator 120 and may instruct the first image generator 118 and/or the second image generator 120 to generate and manipulate a display projected on lens 104. In one example, the processing device 116 may generate a user interface on the lens 104. The processing device 116 may acquire data from other elements or sensors of the wearable device 100 and manipulate the user interface in response to this data.

The first image generator 118 and/or the second image generator 120 may be attached to the first temple 110 and may be substantially aligned with the lens 104. The wearable device 100 may include additional image generators to augment the expanse of generated images over the lens 104 surface area. The first image generator 118 and/or the second image generator 120 may be configured to display images on the lens 104 facing an eye or eyes of the user 102 in FIG. 1A in response to instructions executed by the processing device 116. These images often may overlay and/or augment a naturally viewed scene within a field of vision of the user 102. The first image generator 118 and/or the second image generator 120 may display opaque and/or partially transparent images on the lens 104.

The motion capture device 124 may be connected to the bar 114. In one embodiment, the motion capture device 124 may be oriented away from the user 102 when the user 102 is wearing the wearable device 100 to capture images and motion occurring beyond the lens 104. In another embodiment, the motion capture device 124 may include an image sensor 126 with a camera, a light source 128, and a depth sensor 130. The motion capture device 124 may capture images that include at least a portion of the environment surrounding the wearable device 100 (such as a head-mounted device or a head-mounted display).

The image sensor 126 may be connected to the bar 114. In one embodiment, the image sensor 126 may be oriented away from the user 102 as the user 102 wears the wearable device 100. The image sensor 126 may be configured to capture an image from a scene and communicate data corresponding to the captured image to the processing device 116. The image sensor 126 may capture light within the visual spectrum and/or light outside the visual spectrum. For example, the image sensor 126 may capture infrared or ultraviolet light.

The light source 128 may be connected to the bar 114. The light source 128 may be substantially aligned with the image sensor 126. The light source 128 may be configured to project light in a defined direction. This light is reflected from an object and may be captured by the motion capture device 124. The reflected light may allow the motion capture device 124 to more accurately capture images and motion of objects or the surrounding environment. The light source 128 may project visual light and/or light outside the visual spectrum.

The depth sensor 130 may be connected to the bar 114. The depth sensor 130 may be configured to capture images and motion from a scene at a different angle than image sensor 126. The data captured from this second viewpoint may allow the processing device 116 to compare the data received from the depth sensor 130 to the data received from the image sensor 126 to better detect a depth of objects in the environment surrounding the wearable device 100.

Figure 2:
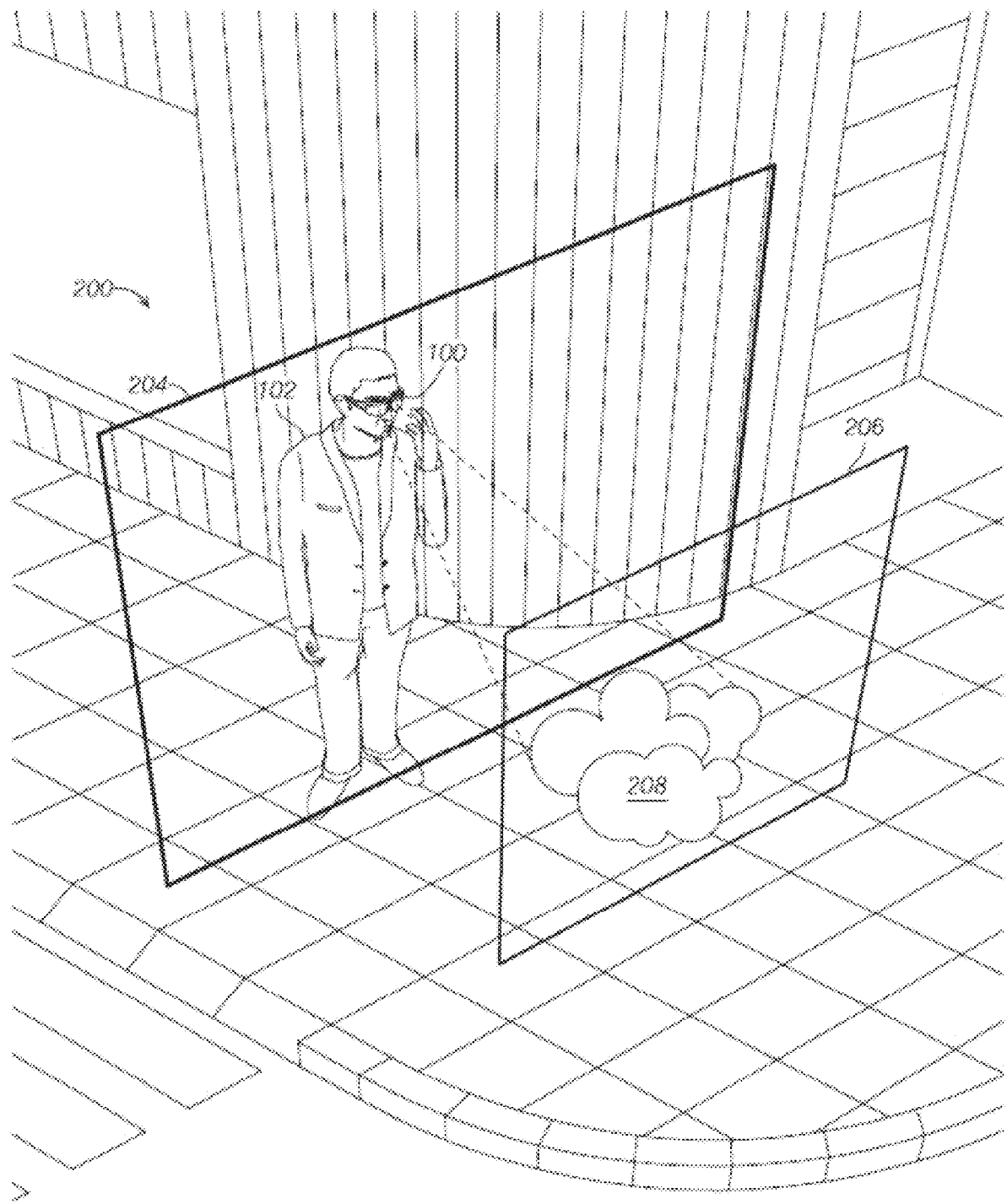
FIG. 2 illustrates an augmented reality system with a user wearing a wearable device, according to an embodiment.

FIG. 2 illustrates an augmented reality system 200 with a user 102 wearing the wearable device 100, according to an embodiment. Some of the features in FIG. 2 are the same or similar to some of the features in FIGS. 1A and 1B as noted by same reference numbers, unless expressly described otherwise. The user may be located along a first plane 204. The wearable device 100 may include a lens 104 to display a virtual object to an eye or eyes of the user 102. For example, the wearable device 100 may include a first portion of the lens 104 that may display a first image or virtual object to a first eye of the user 102 and second portion of the lens 104 that may display a second image or virtual object to a second eye of the user 102. When combined or aggregated, the first image or virtual object and the second image or virtual object may form an augmented reality environment to project one or more virtual or augmented reality objects to the user 102 at defined locations within a physical environment surrounding the user 102.

The wearable device 200 may display multiple images to project one or more virtual or augmented reality objects 208 within a physical environment surrounding the user 102. In one embodiment, the user and the wearable device 100 may be located along the first plane 204 and the augmented reality object 208 may displayed to appear at a defined distance from the user 102 at a second plane 206. In one embodiment, the wearable device 100 may include a position sensor, such as a GPS device or a position transceiver. For example, the wearable device 200 may be a pair of glasses, smart glasses, a face shield, and so forth that may be worn by the user 102 and include multiple sensors, including the position sensor. In another embodiment, the position sensor may separate from the wearable device 200 and be attached to the body of the user 102.

In one example, the position sensor may be positioned proximate to a line of sight of the user 102. In another embodiment, an alignment sensor may measure a difference between a position of the user 102 indicated by the position sensor and the actual location of the user's eyes and generates a view aligned to the user's line of sight. In one embodiment, the lens 104 in FIGS. 1A and 1B may project a virtual or augmented reality environment or a virtual or augmented reality object 208 at a set focal distance from the user 102. In one example, the focal distance may be along the second plane 206. The virtual or augmented reality environment or the virtual or augmented reality object 208 may be a user interface that enhances or supplements the user's interactions in the physical environment and/or physical objects approximate or surrounding the user.

Figure 3:
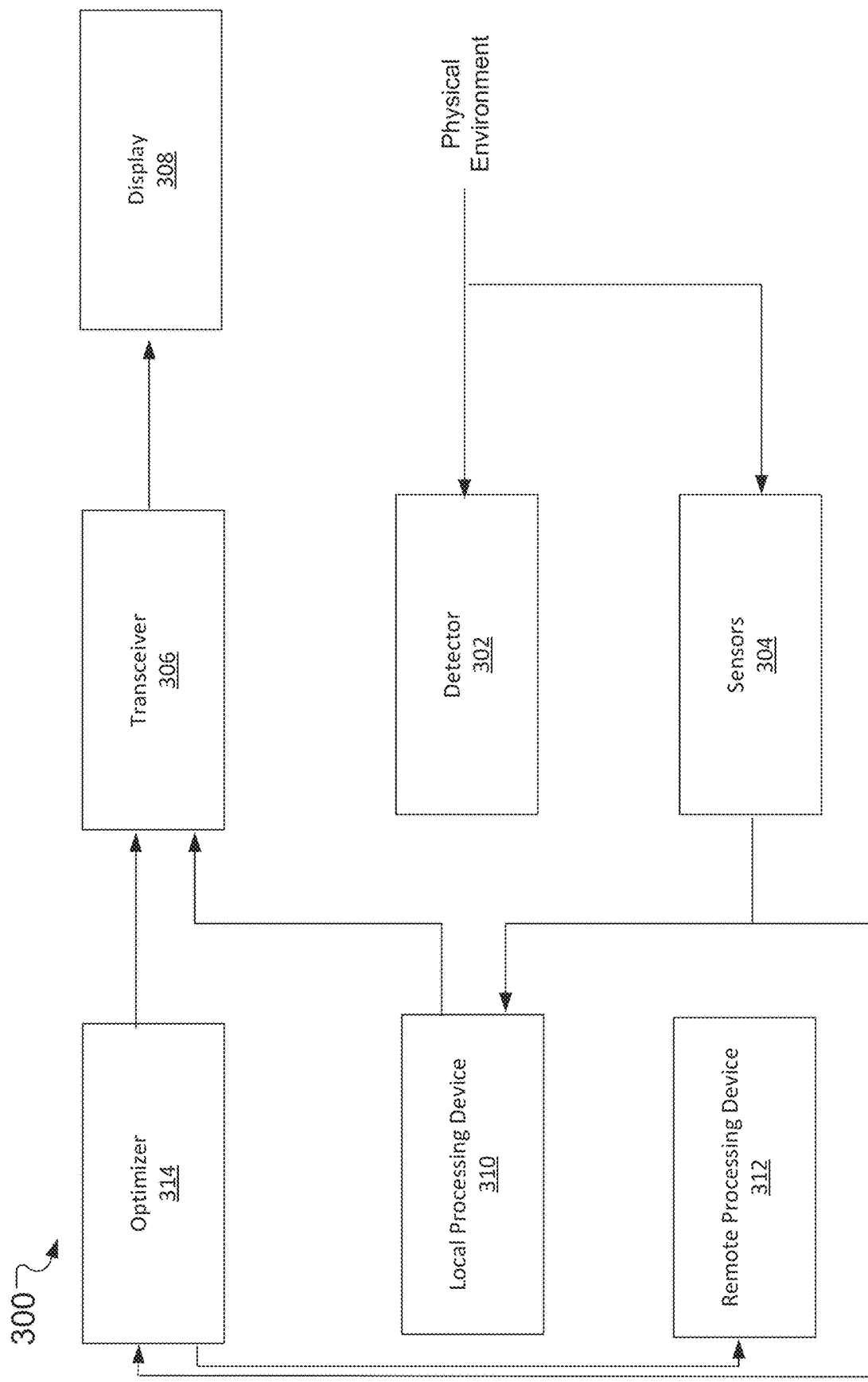
FIG. 3 illustrates a system of the wearable device in FIGS. 1A-1B and/or the wearable device in FIG. 2, according to an embodiment.

FIG. 3 illustrates a system 300 of the wearable device 100 in FIGS. 1A-2, according to an embodiment. The system 300 may include a detector 302, sensors 304, a transceiver 306, an augmented reality display 308, a local processing device 310, a remote processing device 312, and an optimizer 314. In one embodiment, the detector 302 and/or the sensors 304 may take measurements and collect data from a physical environment approximate to the wearable device 100. In another embodiment, the local processing device 310 may be a local processing device attached to or integrated into the wearable device 100.

The local processing device 310 may be positioned proximate to the user that interacts with a remote processing device 312. In another embodiment, the remote processing device 312 may be a remote processing device that may be external to the wearable device 100. The transceiver 306 may receive instructions from the local processing device 310 to project the augmented display 20. The transceiver 306 may measure characteristics from the physical environment and communicate the data to the local processing device 310 and an optimizer 314.

The optimizer 314 may be in communication with the remote processing device 312, the local processing device 310, and the transceiver 306. The transceiver 306 may measure or detect user characteristics or gestures including head position, movement, speed, etc. In one example, using gestures, the user may open applications to be displayed in the augmented environment. These applications may include task flows, attached documents, and so forth. The gestures may allow the user to access the applications and execute instructions such as select instructions, open instructions, scrolling instructions, movement instructions, and so forth. Alternatively, the gestures may be used operate on the icon representing the application by changing the size (zooming in and out), color, sound, and so forth. The gestures may include the user performing scrolling gestures, tapping gestures, or clicking gestures with respect to a virtual object. The scrolling gestures may include body motions, head motions, hand motions, and so forth.

FIG. 4A illustrates a gesture 402 detected by a sensor of the wearable device 100, according to an embodiment. Some of the features in FIG. 4A are the same or similar to some of the features in FIGS. 1A-3 as noted by same reference numbers, unless expressly described otherwise. As discussed above, the wearable device 100 may include one or more sensors to detect a gesture or a movement of a user 102 wearing the wearable device 100. In one example, the sensor may be a gyroscope, a motion sensor, an accelerometer, a three-dimensional (3D) accelerometer, and so forth. In one example, the wearable device 100 may include multiple sensors. In one embodiment, the wearable device 100 may include a sensor to determine the orientation of a head 404 and/or the acceleration of the head 404. The sensor may be a gyroscope, an accelerometer, a 3D accelerometer, and so forth. For example, the wearable device 100 may be a head-mounted display with an integrated gyroscope or accelerometer that may sense different orientations of the head 404 and sense accelerating movements of the head 404.

The wearable device 100 may use the sensor to detect and identify the different movements of the head 404. For example, the wearable device 100 may use data from the sensor to detect a left head movement. In one embodiment, the wearable device 100 may associate the left head movement with an instruction from an input device. For example, the wearable device 100 may associate the left head movement with a left or right swipe or a left or right scrolling of a finger on a touch sensor or a touch screen device.

FIG. 4B illustrates a gesture 406 detected by a sensor of the wearable device 100, according to an embodiment. Some of the features in FIG. 4B are the same or similar to some of the features in FIGS. 1A-4A as noted by same reference numbers, unless expressly described otherwise. As discussed above, the wearable device 100 may include one or more sensors to detect a gesture or movement of the head 404 wearing the wearable device 100. In one example, the wearable device 100 may use data from the sensor to detect a right head movement. In one embodiment, the wearable device 100 may associate the right head movement with an instruction from an input device. For example, the wearable device 100 may associate the right head movement with a right or left swipe or a left or right scrolling of a finger on a touch sensor or touch screen device.

FIG. 4C illustrates a gesture 408 detected by a sensor of the wearable device 100, according to an embodiment. Some of the features in FIG. 4C are the same or similar to some of the features in FIGS. 1A-4B as noted by same reference numbers, unless expressly described otherwise. As discussed above, the wearable device 100 may include one or more sensors to detect a gesture or movement of the user 102 wearing the wearable device 100. In one example, the wearable device 100 may use data from the sensor to detect an upward and/or downward movement of the head 404. In one embodiment, the wearable device 100 may associate the upward and/or downward head movement with an instruction from an input device. For example, the wearable device 100 may associate a upward head movement with an upward scrolling movement of a finger on a touch sensor or touch screen device and a downward head movement with an downward scrolling movement of a finger on a touch sensor or touch screen device, or vise versa.

In one embodiment, the sensor(s) of wearable device 100, such as a gyroscope, may identify an initial orientation of the head 404. In one example, the initial orientation of the head 404 may be an orientation of the head 404 when a scrolling session is initiated for a selected application or function. In this example, when a user initiates a scrolling session the wearable device 100 may use the sensor(s) to determine an orientation of the head at the initiation of the scrolling session and define that orientation as initial or default orientation. In another example, when the scrolling session initiates, the wearable device 100 may provide a prompt or a notification to the user to position their head at a default or user defined orientation to set the initial orientation. In another example, the user may perform a gesture or provide an input via an input device to reset the initial orientation to a new default or initial orientation used to control movement and/or scrolling functions or instructions as discussed herein.

A processing device of the wearable device 100 may determine a location within a user interface that the user is viewing or is focusing on. For example, the processing device may identify a location on a page in a document displayed in the user interface that the user is viewing. In one embodiment, to determine the location in the user interface that the user is viewing or focusing on, the wearable device 100 may include one or more optical sensors to determine an orientation and/or position of the eye or retinas of the user relative to the user interface. As discussed above, the wearable device 100 may include a transceiver. In another embodiment, the transceiver may be positioned proximate to the user's line of sight and the processing device may approximate a location the user is viewing within the augmented reality environment based on where the transceiver is directed in the augmented reality environment.

In another embodiment, to determine the location in the user interface that the user is viewing or focusing on, the wearable device 100 may use a sensor to detect a gesture indicating a body part of the user (such as their hand) is hover over or approximate an element displayed in the user interface. In another embodiment, to determine the location in the user interface that the user is viewing or focusing on, the wearable device 100 may use a sensor to perform gaze tracking of the user. When the wearable device 100 has determined location within a user interface that the user is viewing or is focusing on, the wearable device 100 may target or lock onto the element or object in the user interface at that location and perform a movement function or a scrolling function based on a movement or position of the user's head, as described herein. In one example, when the element or object has been identified by the processing device of the wearable device 100 the movement or scrolling function may only be applied to the selected element or object and other elements or objects displayed in the user interface may not change while the movement function or the scrolling function is performed. When the user has completed the movement function or the scrolling function for a selected object or element, the user may perform a different gesture to indicate the completion of the movement function or the scrolling function and/or may select another object or element for moving or scrolling as described herein.

In one embodiment, a display device of the wearable device 100 may display a virtual object as an image within the augmented reality display. After determining a location in the augmented reality environment that the user is viewing, the processing device may execute movement or scrolling instructions or other instructions associated based on gesture with respect to the virtual object the user is viewing. The motion of the user's head 404 may correspond to the movement or scrolling of the virtual object. In another embodiment, the location sensor may adjust for the difference between the position of the transceiver and the user's vision and display the virtual object(s) to be aligned to the user's line of sight.

Regarding FIGS. 4A-4C, in one embodiment, a head 404 of user 102 may be positioned along an x-axis, a y-axis, and a z-axis. The gestures may be in along a plane of a body or head 404 of the user 102. For example, the head 404 of the user 102 may act as a joystick controller. In one embodiment, an initial orientation of the head 404 may be a start of the gesture. The initial orientation may be a default orientation for a gesture. In one example, when the head 404 moves past the initial tilt, the scrolling speed corresponds to the range of the head motion. For example, when the user tilts their head 404 at a first angle or range of angles (such as an angle or range between 0.1 to 5 degrees) from the initial orientation, the scrolling function may scroll in the direction of the head tilt at a first speed. In another example, when the user tilts their head 404 at a second angle or range of angles (such as an angle or range between 5.1 to 10 degrees) from the initial orientation, the scrolling function, au scroll in the direction of the head tilt at a second speed. In another example, as the angle or range of angles increases the scrolling speed may correspondingly increase. When the head 404 returns to the original position, the scrolling may stop.

In another embodiment, the wearable device 100 may follow the head 404 and the scrolling associated with the head gestures may remain constant as the head 404 remains at the same tilt level until the head 404 returns back to the initial position. In another embodiment, only selected or locked elements in a display or a program may be scrolled while the head 404 is moving rotationally and/or translationally.

As discussed below, FIGS. 4A-C illustrate movements or gestures detected by a sensor, such as a gyroscope. The arrows indicate the movement of the head. FIG. 4A may illustrate a left head rotational motion may be associated with a right swipe command or a right scrolling command and FIG. 4B may illustrate a right rotational motion may be associated with a left swipe command or a left scrolling command, or vise versa. FIG. 4C may illustrate an up or down nodding motion associated with a upward or downward scrolling command. The acceleration detected by the accelerometer indicates a speed and/or acceleration of the head movement, which may correspond to a magnitude of the scrolling.

The gestures 402, 406, and/or 408 discussed above are not intended to be limiting. While head movement gestures may be discussed, other movements, such as body motions or hand motions may be associated with instructions executed by the processing device.

Figure 5:
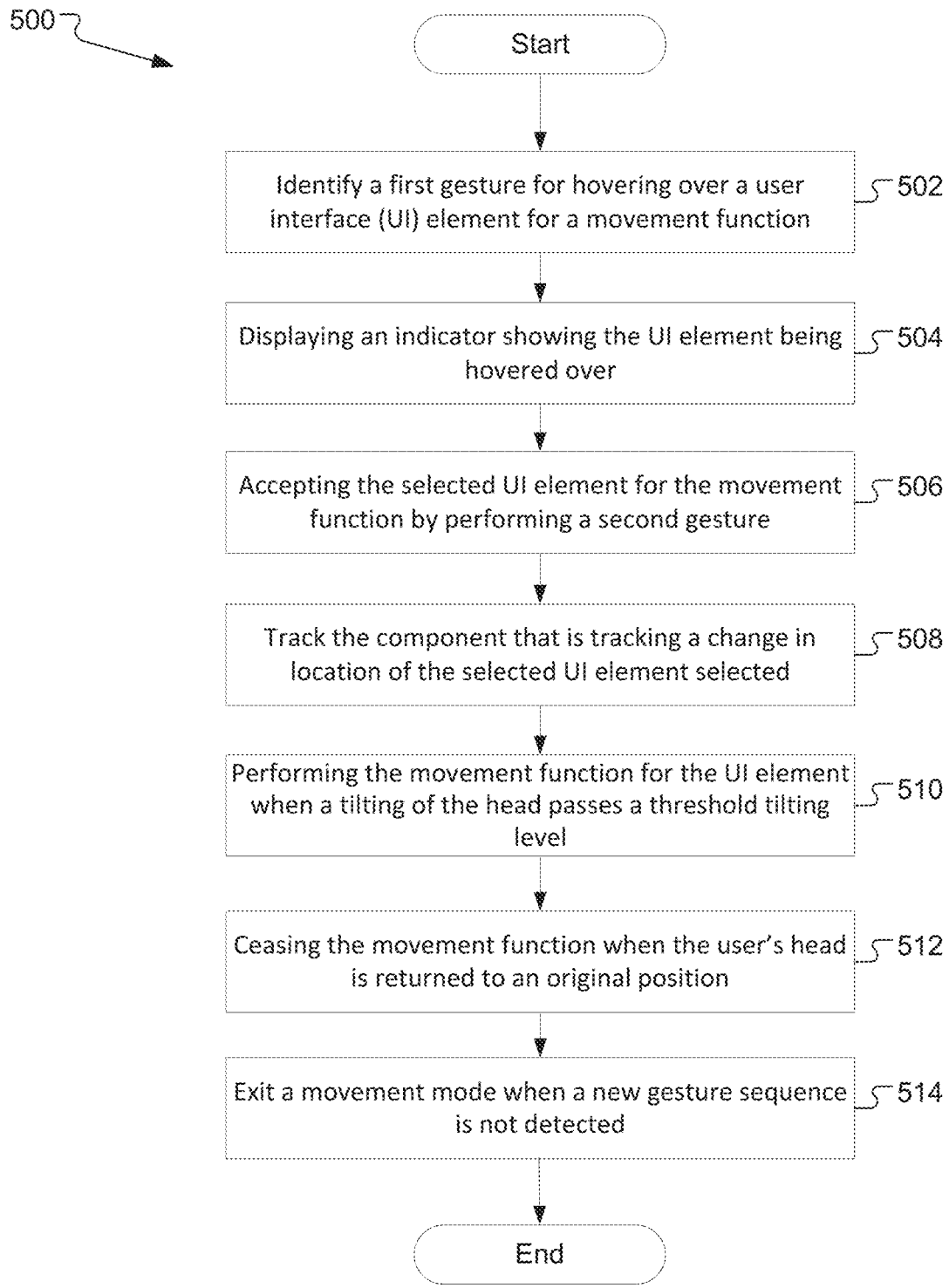
FIG. 5 is a flowchart for a gesture referenced herein, according to an embodiment.

FIG. 5 is a flowchart 500 for a method to move or scroll a virtual object, according to an embodiment. The method may include identifying a first gesture for selecting a virtual object for a movement command (block 502). In one example, the first gesture may be a hovering gesture, a hand motion, a finger tapping motion, and so forth. In another example, the first gesture may be a hand motion with a finger lingering on the virtual object for a predetermined time. In another example, when the movement command has not been initiated, the head motion of the user may be used to control a cursor within the user interface and once a target in the user interface (such as an object or element) has been selected or identified in the user interface, the processing device may switch to the movement command for the selected or identified target corresponding to the head motion.

The method may include displaying an indicator showing the virtual object being selected, such as being hovered over (block 504). For example, a cursor may be used to select the virtual object and once the element is selected, the cursor may be changed to be an indicator associated with the movement command. In once example, the indicator may be indicia, text, a graphical object (such as an arrow), or another visual indicator. In another embodiment, the indicator may include changing a color and/or an illumination intensity of the user interface, a portion of the user interface, or the virtual object. In another embodiment, the indicator may include outlining the selected element or object in the user interface.

The method may include the processing device selecting the virtual object for the movement command by performing a second gesture, such as a user moving their head away from an axis relative to the user (block 506). In one example, the user may rotate the head along the axis (also referred to as a head axis). In another example, when the user tilts his/her head beyond a threshold point or angle relative to the axis, a processing device may use a sensor to automatically recognize the movement function and identify the virtual object the user selected when the user first tilted his/her head to automatically execute the movement command for that virtual object. In another embodiment, the user may confirm the selection with a command, e.g. a head gesture or an audible tone.

The method may include the processing device tracking a change in location of the selected virtual object (block 508). For example, the virtual object may move within an augmented reality environment as the user moves with the augmented reality environment and the processing device may track a location of the selected virtual object as it moves within the augmented reality environment. The method includes performing the movement function for the virtual object (such as scrolling or moving the selected virtual object) when a tilting of the head passes a threshold tilting level (block 510). In another embodiment, the movement command may include a scrolling function to scroll text and/or graphics of the virtual object up, down, or across. In another embodiment, the movement command may include a movement function to move the entire virtual object from a first location to a second location within the augmented reality environment.

In one embodiment, the wearable device may move with the user's head. As discussed above, the method may include selecting or locking onto the virtual object. In another embodiment, when the user's head rotates passed the threshold, the processing device may start to scroll or move the virtual object. For example, the user may unconsciously or unintentionally move their head a minor amount in performing other tasks or due to a normal physiological movement of the body. In this example, the processing device of the wearable device may define a reference rotational axis corresponds to an axis coincident with the head as a default axis from which to measure a relative movement of the head. The processing device may then define a threshold distance that the head must move relative to the reference rotational axis before a scrolling function may be performed. In one example, the threshold distance may be a predefined distance or angle from the reference rotational axis, such as 3 degrees.

In another example, the processing device may monitor the movement of the head of the user over a period of time to identify the unconscious or unintentional movements of the user's head and filter out the identified unconscious or unintentional movements of the user's head. In another embodiment, the processing device may filter out movements of the user's head that exceed a speed threshold or that have an erratic or irregular pattern. For example, when the user moves their head relatively quickly such that the movement exceeds a defined speed (linear speed, angular speed, and/or rotational speed), the user may not intend to scroll with the head movement and may be moving their head to avoid an object, moving their head due to an involuntary twitch, may be turning their head to talk with someone, and so forth. Such movements may be filtered out by the processing device of the wearable device.

The method may include, the processing device ceasing the movement command when the user's head is returned to an original position (block 512). The method may include, the processing device exiting a movement command mode when a new gesture sequence is not detected (block 514). For example, when the processing device does not receive a gesture or movement instruction or input for a threshold period of time, the processing device may exit the movement command mode. Not receiving the gesture instruction or input for the threshold period of time may indicate that the user in no longer interacting with the interface, using the movement command mode, or that the user has become inactive. In this example, the processing device may automatically exit the movement command mode so that user may perform other activities, the processing device may shutdown, or the processing device may enter a sleep mode.

Figure 6:
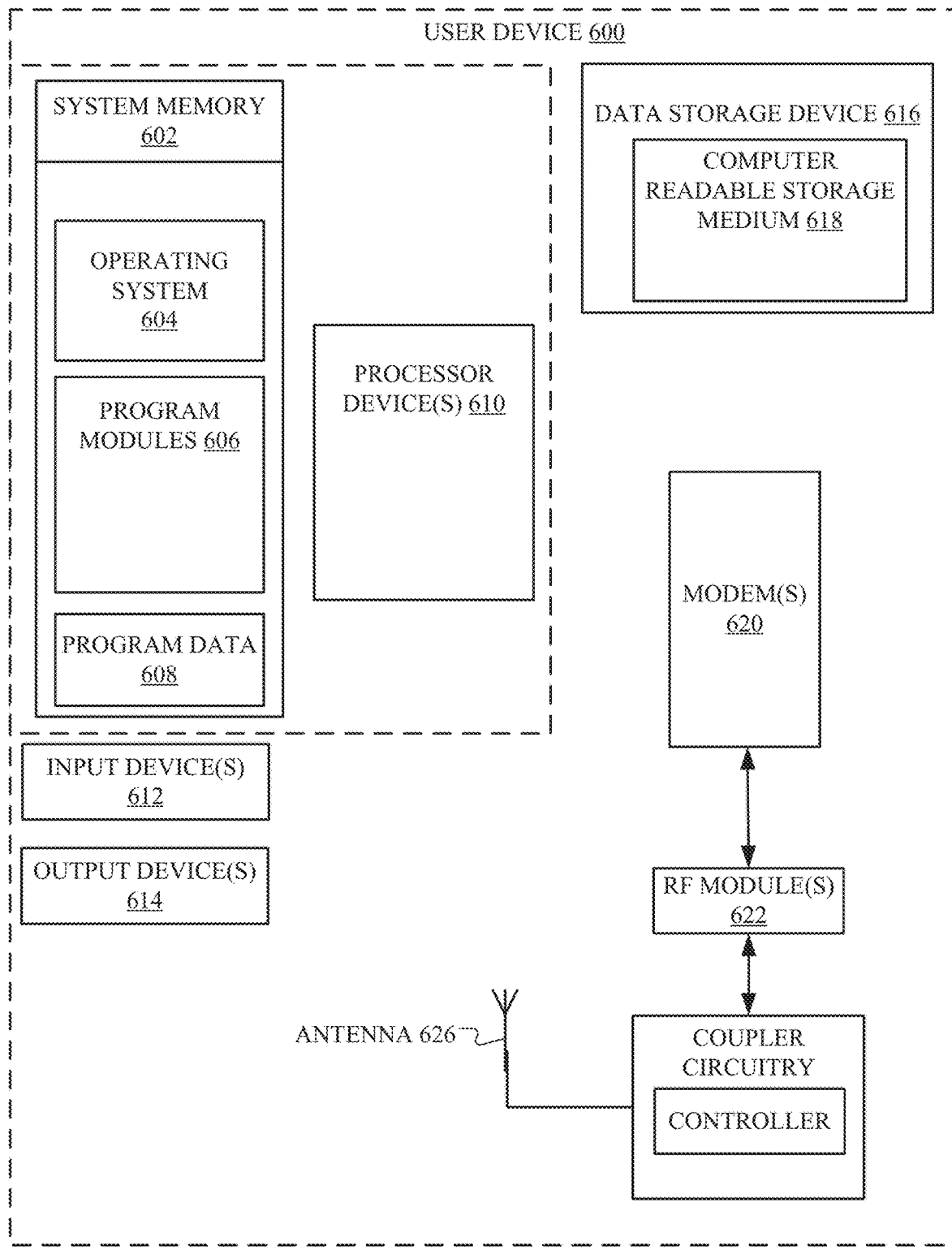
FIG. 6 is a block diagram of a user device with a processing device in which implementations of methods, systems, devices, or apparatuses in FIGS. 1-5 may be implemented.

FIG. 6 is a block diagram of a user device 600 with a processing device in which implementations of methods, systems, devices, or apparatuses in FIGS. 1A-5 may be implemented. The user device 600 may display and/or implement the method and GUIs of FIGS. 1A-5. The user device 600 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 600 may be any portable or stationary user device. For example, the user device 600 may be an intelligent voice control and speaker system. Alternatively, the user device 600 can be any other device used in a WLAN network (e.g., Wi-Fi® network), a WAN network, or the like.

The user device 600 includes one or more processing device(s) 610, such as one or more CPUs, microcontrollers, field programmable gate arrays, or other types of processing devices. The user device 600 also includes system memory 602, which may correspond to any combination of volatile and/or non-volatile storage mechanisms. The system memory 602 stores information that provides operating system 604, various program modules 606, program data 608, and/or other components. In one implementation, the system memory 602 stores instructions of the method 500 as described herein. The user device 600 performs functions by using the processing device(s) 610 to execute instructions provided by the system memory 602.

The user device 600 also includes a data storage device 616 that may be composed of one or more types of removable storage and/or one or more types of non-removable storage. The data storage device 616 includes a computer-readable storage medium 618 on which is stored one or more sets of instructions embodying any of the methodologies or functions described herein. Instructions for the program modules 606 may reside, completely or at least partially, within the computer-readable storage medium 618, system memory 602 and/or within the processing device(s) 610 during execution thereof by the user device 600, the system memory 602 and the processing device(s) 610 also constituting computer-readable media. The user device 600 may also include one or more input devices 612 (keyboard, mouse device, specialized selection keys, etc.) and one or more output devices 614 (displays, printers, audio output mechanisms, etc.).

The user device 600 further includes modem 620 to allow the user device 600 to communicate via a wireless network(s) (e.g., such as provided by the wireless communication system) with other computing devices, such as remote computers, an item providing system, and so forth. The modem 620 can be connected to zero or more RF modules 622. The zero or more RF modules 622 can be connected to zero or more coupler circuitry 624. The RF modules 622 and/or the coupler circuitry 624 may be a WLAN module, a WAN module, PAN module, or the like. Antenna 626 is coupled to the coupler circuitry 624, which is coupled to the modem 620 via the RF modules 622. The modem 620 allows the user device 600 to handle both voice and non-voice communications (such as communications for text messages, multimedia messages, media downloads, web browsing, etc.) with a wireless communication system. The modem 620 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi® technology, Long Term Evolution (LTE) and LTE Advanced (sometimes generally referred to as 4G), etc.

The modem 620 may generate signals and send these signals to antenna 626 via coupler circuitry 624 as described herein. User device 600 may additionally include a WLAN module, a GPS receiver, a PAN transceiver and/or other RF modules. The coupler circuitry 624 may additionally or alternatively be connected to one or more of coupler arrays. The antenna 626 may be configured to transmit in different frequency bands and/or using different wireless communication protocols. The antenna 626 may be directional, omni-directional, or non-directional antennas. In addition to sending data, the antenna 626 may also receive data, which is sent to appropriate RF modules 622 connected to the antenna 626.

In one implementation, the user device 600 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one implementation, the first wireless connection is associated with a first resonant mode of an antenna structure that operates at a first frequency band and the second wireless connection is associated with a second resonant mode of the antenna structure that operates at a second frequency band. In another implementation, the first wireless connection is associated with a first antenna element and the second wireless connection is associated with a second antenna element. In other implementations, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though modem 620 is shown to control transmission and reception via the antenna 626, the user device 600 may alternatively include multiple modems, each of which is configured to transmit/receive data via a different antenna and/or wireless transmission protocol.

The user device 600 delivers and/or receives items, upgrades, and/or other information via the network. For example, the user device 600 may download or receive items from an item providing system. The item providing system receives various requests, instructions and other data from the user device 600 via the network. The item providing system may include one or more machines (e.g., one or more server computer systems, routers, gateways, etc.) that have processing and storage capabilities to provide the above functionality. Communication between the item providing system and the user device 600 may be enabled via any communication infrastructure. One example of such an infrastructure includes a combination of a wide area network (WAN) and wireless infrastructure, which allows a user to use the user device 600 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected to the network. The WLAN hotspots can be created by products based on IEEE 802.11x standards for the Wi-Fi® technology by Wi-Fi® Alliance. Another of the wireless communication systems may be a wireless carrier system that can be implemented using various data processing equipment, communication towers, etc. Alternatively, or in addition, the wireless carrier system may rely on satellite technology to exchange information with the user device 600.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user device 600 is variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 600 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that implementations may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present implementations are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other implementations will be apparent to those of skill in the art upon reading and understanding the above description. The scope of the present implementations should, therefore, be determined with reference to the appended claims, along with the full scope of equivalents to which such claims are entitled.

In the above description, numerous details are set forth. It will be apparent, however, to one of ordinary skill in the art having the benefit of this disclosure, that implementations may be practiced without these specific details. In some instances, well-known structures and devices are shown in block diagram form, rather than in detail, in order to avoid obscuring the description.

Although the implementations may be herein described with reference to specific integrated circuits, such as in computing platforms or micro-processing devices, other implementations are applicable to other types of integrated circuits and logic devices. Similar techniques and teachings of implementations described herein may be applied to other types of circuits or semiconductor devices. For example, the disclosed implementations are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, smartphones, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that may perform the functions and operations taught below.

Although the implementations are herein described with reference to a processing device or processing device, other implementations are applicable to other types of integrated circuits and logic devices. Similar techniques and teachings of implementations of the present invention may be applied to other types of circuits or semiconductor devices that may benefit from higher pipeline throughput and improved performance. The teachings of implementations of the present invention are applicable to any processing device or machine that performs data manipulations. However, the present invention is not limited to processing devices or machines that perform 512 bit, 256 bit, 128 bit, 64 bit, 32 bit, and/or 16 bit data operations and may be applied to any processing device and machine in which manipulation or management of data is performed. In addition, the following description provides examples, and the accompanying drawings show various examples for the purposes of illustration. However, these examples should not be construed in a limiting sense as they are merely intended to provide examples of implementations of the present invention rather than to provide an exhaustive list of all possible implementations of implementations of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or media devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

Implementations described herein may also relate to an apparatus for performing the operations herein. This apparatus may be specially constructed for the required purposes, or it may comprise a computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present implementations. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present implementations.

The algorithms and displays presented herein are not inherently related to any particular computer or other apparatus. Various computing systems may be used with programs in accordance with the teachings herein, or it may prove convenient to construct a more specialized apparatus to perform the operations. The required structure for a variety of these systems will appear from the description below. In addition, the present implementations are not described with reference to any particular programming language. It will be appreciated that a variety of programming languages may be used to implement the teachings of the implementations as described herein.

The above description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

It is to be understood that the above description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The disclosure above encompasses multiple distinct embodiments with independent utility. While these embodiments have been disclosed in a particular form, the specific embodiments disclosed and illustrated above are not to be considered in a limiting sense as numerous variations are possible. The subject matter of the embodiments includes the novel and non-obvious combinations and sub-combinations of the various elements, features, functions and/or properties disclosed above and inherent to those skilled in the art pertaining to such embodiments. Where the disclosure or subsequently filed claims recite "a" element, "a first" element, or any such equivalent term, the disclosure or claims is to be understood to incorporate one or more such elements, neither requiring nor excluding two or more such elements.

Applicant(s) reserves the right to submit claims directed to combinations and sub-combinations of the disclosed embodiments that are believed to be novel and non-obvious. Embodiments embodied in other combinations and sub-combinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

The invention claimed is:

1. An apparatus, comprising:
   a head-mounted display that displays a virtual object in an augmented reality environment;
   a sensor attached to the head-mounted display, wherein the sensor is configured to detect a movement of the head-mounted display indicative of a movement of a head of a user; and
   a processing device coupled to the head-mounted display and the sensor, wherein the processing device is configured to:
     display, using the head-mounted display the virtual object;
     detect, using the sensor, the movement of the head-mounted display associated with a movement command, wherein to detect the movement of the head-mounted display associated with the movement command, the processing device is configured to:
       determine an initial orientation of the head relative to an axis;
       determine that the head-mounted display tilts at an angle relative to the axis of the initial orientation;
       in response to the angle exceeding a threshold angle, determine that the movement is associated with the movement command; and
       in response to the angle not exceeding the threshold angle, determine that the movement is not associated with the movement command; and
     in response to detecting the movement of the head-mounted display, execute the movement command, wherein the movement command is:
       a scrolling function to scroll text or a graphical object of the virtual object; or
       a movement function to move the text, the graphical object, or the virtual object.

2. The apparatus of claim 1, wherein the processing device is further configured to, in response to detecting the movement of the head mounted display ceasing, terminate the movement command.

3. The apparatus of claim 1, wherein the threshold angle is a three-degree tilt relative to the axis.

4. The apparatus of claim 1, wherein the processing device is further configured to:
   in response to the angle exceeding the threshold angle, automatically recognize the movement command; and
   identify the virtual object as being selected by the user.

5. The apparatus of claim 1, wherein the movement of the head-mounted display comprises the user tilting their head downward, wherein the user tilting their head downward is associated with the scrolling function to scroll upward or downward within the text or the graphical object of the virtual object.

6. The apparatus of claim 1, wherein the movement of the head-mounted display comprises the user tilting their head upward, wherein the user tilting their head upward is associated with the scrolling function to scroll upward or downward within the text or the graphical object of the virtual object.

7. The apparatus of claim 1, wherein the movement of the head-mounted display comprises the user swiping their head from left to right, wherein the user swiping their head from left to right is associated with the scrolling function to scroll leftward or rightward within the text or the graphical object of the virtual object.

8. The apparatus of claim 1, wherein the movement of the head-mounted display comprises the user swiping their head from right to left, wherein the user swiping their head from right to left is associated with the scrolling function to scroll leftward or rightward within the text or the graphical object of the virtual object.

9. The apparatus of claim 1, wherein the movement of the head-mounted display comprises the user tilting their head downward, wherein the user tilting their head downward is associated with the movement function to move the virtual object upward or downward within the augmented reality environment.

10. The apparatus of claim 1, wherein the movement of the head-mounted display comprises the user tilting their head upward, wherein the user tilting their head upward is associated with the movement function to move the virtual object upward or downward within the augmented reality environment.

11. The apparatus of claim 1, wherein the movement of the head-mounted display comprises the user swiping their head from left to right, wherein the user swiping their head from left to right is associated with the movement function to move the virtual object leftward or rightward within the augmented reality environment.

12. The apparatus of claim 1, wherein the movement of the head-mounted display comprises the user swiping their head from right to left, wherein the user swiping their head from right to left is associated with the movement function to move the virtual object leftward or rightward within the augmented reality environment.

13. The apparatus of claim 1, further comprising an additional sensor attached to the head-mounted display, wherein:
   the additional sensor is configured to detect a gesture by a user of the head-mounted display; and
   the processing device is further configured to detect, using the additional sensor, the gesture associated with selecting the first virtual object.

14. A device, comprising:
a head-mounted display configured to display a virtual object in an augmented reality environment;
a sensor attached to the head-mounted display, wherein the sensor is configured to detect a movement of the head-mounted display indicative of a movement of a head of the user; and
a processing device coupled to the head-mounted display and the sensor, wherein the processing device is configured to:
  detect, using the sensor, the movement of the head-mounted display associated with a movement command;
  in response to detecting the movement of the head-mounted display, execute the movement command, wherein the movement command is at least one of:
    a movement function to move the virtual object from a first location in the augmented reality environment to a second location in the augmented reality environment; or
    a scrolling function to move text or a graphical object of the virtual object;
  determine when the movement of the head-mounted display exceeds a threshold speed;
  in response to the movement exceeding the threshold speed, determine the movement is not associated with the movement command; and
  filter out the movement from data received from the sensor.

15. The device of claim 14, wherein the processing device is further configured to, in response to the movement of the head-mounted display ceasing, terminate the movement command.

16. The device of claim 14, wherein the processing device is further configured to display, using the head-mounted display, an indicator indicating a selection of the virtual object.

17. The device of claim 14, wherein the processing device is further configured to:
  determine when the movement of the head-mounted display is associated with at least one of:
    an unconscious movement of the head;
    an unintentional movement of the head;
    an erratic movement of the head; or
    an irregular movement of the head; and
  filter out the movement from data received from the sensor.

18. A method, comprising:
displaying, by the head-mounted display, a first virtual object;
detecting, using a first sensor or a second sensor, a first movement of the head-mounted display associated with a first movement command;
in response to detecting the first movement of the head-mounted display, executing the first movement command, wherein the first movement command is:
  a first scrolling function to scroll text of the first virtual object;
  a second scrolling function to scroll a graphical object of the first virtual object;
  a first movement function to move the text; or
  a second movement function to move the graphical object;
determining that the head-mounted display has not moved a threshold amount with a threshold period of time; and
ceasing to monitor for movements of the head-mounted display.

19. The method of claim 18, further comprising:
displaying, by the head-mounted display, a second virtual object;
detecting, using the first sensor or the second sensor, a second movement of the head-mounted display associated with a second movement command; and
in response to detecting the second movement of the head-mounted display, executing the second movement command, wherein the second movement command is:
  the first scrolling function to scroll text of the second virtual object;
  the second scrolling function to scroll a graphical object of the second virtual object;
  the first movement function to move the text of the second virtual object; or
  the second movement function to move the graphical object of the second virtual object.

20. The method of claim 18, further comprising:
detecting, by the first sensor, a first gesture associated with selecting the first virtual object in the augmented reality environment; and
displaying, by the head-mounted display, a first indicator indicating a selection of the first virtual object by the user.

* * * * *